May 10, 1927.

H. CARTER

DEVICE FOR ICING CAKES

Filed Nov. 14, 1925

1,627,630

Inventor
Hubert Carter
by Fetherstonhaugh & Co.
Attys.

Patented May 10, 1927.

1,627,630

UNITED STATES PATENT OFFICE.

HUBERT CARTER, OF TORONTO, ONTARIO, CANADA.

DEVICE FOR ICING CAKES.

Application filed November 14, 1925. Serial No. 69,047.

My invention relates to improvements in device for icing cakes and the object of the invention is to devise simple means whereby various patterns may be quickly and expeditiously stenciled in icing upon the top of a cake, and at the same time provide such a means as will accurately stencil in outline any pattern desired, and it consists essentially of the arrangement and construction of parts as hereinafter more particularly explained.

In the drawings like characters of reference indicate corresponding parts in each figure.

Figures 1, 2:
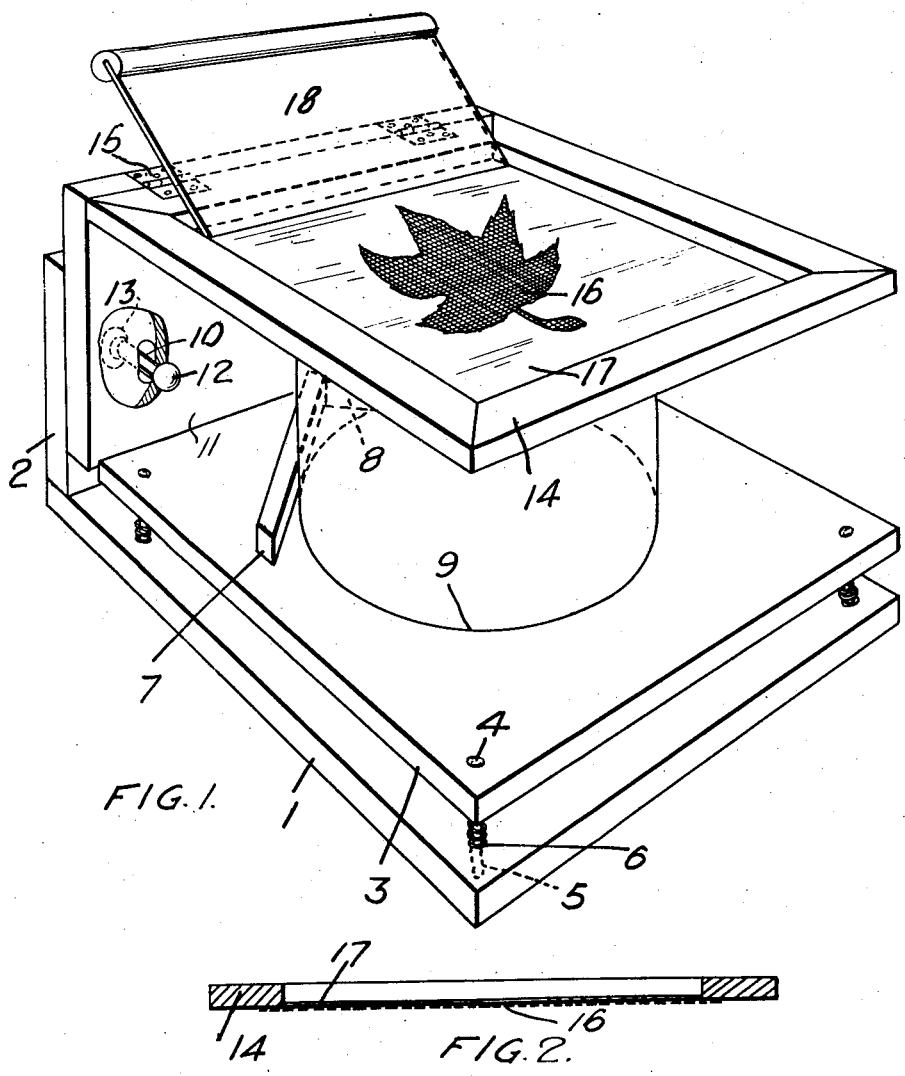
Fig. 1 is a perspective view of my device.
Fig. 2 is a sectional view through the stenciling plate.

1 indicates a base provided with a back wall 2 extending upward therefrom at right angles thereto. 3 is a supplemental base or cake carrier provided with pins 4 extending downward into orifices 5 formed in the base 1. 6 is a compression spring encircling each pin 4 between the base 1 and supplemental base 3. 7 and 8 are bars secured to the supplemental base 3 in V-form forming a V recess into which the cake 9 is fitted to accurately position the cake. 10 are slots formed in the wall 2. 11 is a wall portion through which extend bolts 12 which also pass through the slots 10 of the wall 2 and are clamped in position by suitable nuts as indicated at 13.

14 is a frame of a stencil plate hingedly connected to the upper edge of the wall 11 as indicated at 15. 16 is a gauze mesh secured at its edges to the frame 14 and extending over the open centre thereof as clearly indicated at Figure 2. 17 is a sheet of shim brass or other suitable metal out of which the pattern to be stenciled is cut. The sheet 17 is laid within the frame 14 and upon the gauze mesh 16.

18 is a squeegee formed of comparatively stiff rubber and adapted when its lower edge is passed horizontally over the surface of the metal 17 to force the icing liquid through the opening in the metal 17 and through that portion of the mesh 16 which is exposed through the opening in the metal 17.

The mesh 16 when the cake is in position on the supplemental base 3 rests upon the top of the cake so that the icing which is forced through this mesh as above described is received by the surface of the cake and forms the pattern thereon.

By this means it will be seen that not only may any design be readily reproduced in icing upon the cake, but also multi-coloured designs, as after the icing in one colour has been transferred onto the cake as above described, the sheet 17 may be changed for another sheet so cut as to transfer the icing liquid of another colour onto the cake surface. By the employment of the resilient supplemental base 3 any depth of cake may be readily placed in position for icing. If further adjustment is necessary this may be done by loosening the bolts 12 and raising or lowering the plate portion 11.

What I claim as my invention is:

1. In a device for icing cakes, a resiliently supported base upon which the cake to be iced is adapted to rest, a supporting standard, a frame secured to the standard and extending over the base and spaced apart therefrom to permit the insertion of the cake, a wire mesh secured to the frame and extending over the open portion thereof, a stencil sheet laid upon the mesh through which and the mesh the icing liquid is adapted to be forced onto the cake top, and means for permitting the vertical adjustment of the frame in relation to the base.

2. In a device for icing cakes, a resiliently supported base upon which the cake to be iced is adapted to rest, a supporting standard located adjacent the base, a standard extension provided with vertical slots, securing bolts extending through the standard, clamping means extending through the standard, slots adapted to secure the extension in any desired position, a frame secured to the upper end of the standard extension and extending over the cake, and stencilling means supported within the frame.

HUBERT CARTER.